United States Patent

[11] 3,599,984

[72] Inventor Tatsuo Kondo
Tokyo, Japan
[21] Appl. No. 697,520
[22] Filed Jan. 12, 1968
[45] Patented Aug. 17, 1971
[73] Assignee Victor Company of Japan, Limited
Kanagawa-ku, Japan
[32] Priority Jan. 16, 1967
[33] Japan
[31] 42/2678

[54] AUTOMATIC CONTROL DEVICE FOR RECORD PLAYERS
7 Claims, 13 Drawing Figs.

[52] U.S. Cl. 274/1 L
[51] Int. Cl. G11b 17/06
[50] Field of Search 274/1 L, 1 R, 23

[56] References Cited
UNITED STATES PATENTS

| | | | |
|---|---|---|---|
| 2,085,582 | 6/1937 | Guedon | 274/1 (.11) |
| 2,405,526 | 8/1946 | Sinnett | 274/1 X |
| 3,503,615 | 3/1970 | Matsuda | 274/1 |

*Primary Examiner*—Harry N. Haroian
*Attorney*—Stevens, Davis, Miller & Mosher

ABSTRACT: An automatic control device for record players which is operatively connected to a pickup arm for converting a variation in the rate of movement of the pickup arm into a change in voltage to thereby detect the position of the leadout groove of a record. The device operates in response to the detected output voltage change to restore the pickup arm to its original position.

AUTOMATIC CONTROL DEVICE FOR RECORD PLAYERS

The present invention relates to an automatic control device for record players. In particular, the invention is concerned with a device for effecting control of the operation of pickup arm return means to restore the pickup arm to its original position by electrically detecting the position of the leadout groove of a record.

In record players in general, the so-called automatic stopper device for automatically stopping the turntable when performance is over or automatic return device for returning the pickup arm to the rest position when performance is over have hitherto been directly driven by the mechanical rotational force of the pickup arm, as in subsequently to be described, when it is positioned in the leadout groove after performance is over. However, such method is not without a disadvantage. Since mechanical means coupled to the pickup is employed for detecting the leadout groove after the completion of performance, the operation of this means is invariably accompanied by the occurrence of a frictional dragging between the stylus point and the record surface transversely of the record or normal to the grooves on the record. This often causes the stylus to skip or a damage to the stylus point or the record surface to occur. This makes it difficult to lower the stylus pressure, for stabilization of the operation of this mechanism has a priority over the stylus pressure. For this reason, it has been difficult to lower the stylus pressure, and full realization of advantages from use of a cartridge of highly advanced quality has been hampered by inability to lower the stylus pressure.

Proposals have been made to obviate this disadvantage by attaching a light intercepting plate to the shaft for moving the pickup arm, said light intercepting plate being caused to move between a cadmium sulfide (CdS) cell and an electric lamp so that the stopper or the like can be actuated when the resistance value of the CdS cell has reached a predetermined level. This device is of the so-called position type or one in which the stopper is actuated when the pickup arm has reached a predetermined position. The device does not lend itself to use with some types of records in which the position of the leadout groove (or the distance from the center) varies from the standard.

The present invention obviates the aforementioned disadvantage of the prior art device.

A principal object of the invention is to provide an automatic control device for record players which involves a simple circuit which is stable and positive in operation for restoring a pickup arm to its original position.

Another object of the invention is to provide an automatic control device for record players which can perform control by positively detecting the position of the leadout groove of a record at all times irrespective of the size of the record.

Another object of the invention is to provide an automatic control device for record players of the speed control type which detects a variation in the rate of movement of a pickup arm to thereby detect the position of the leadout groove of a record.

Further object of the invention is to provide an automatic control device for record players which electrically detects the position of the leadout groove of a record to thereby actuate pickup arm return means or the like.

Still another object of the invention is to provide an automatic control device for record players which electrically detects a variation in the rate of movement of a pickup arm and actuates mechanically operated means by its detected output, whereby the pickup arm can be prevented from carrying undue forces in detecting the position of the leadout groove of a record, so as to permit the pickup to be maintained under a low stylus pressure. Other objects and advantages of the invention will become apparent from consideration of the following description when taken in conjunction with the drawings, in which:

Figure 1:
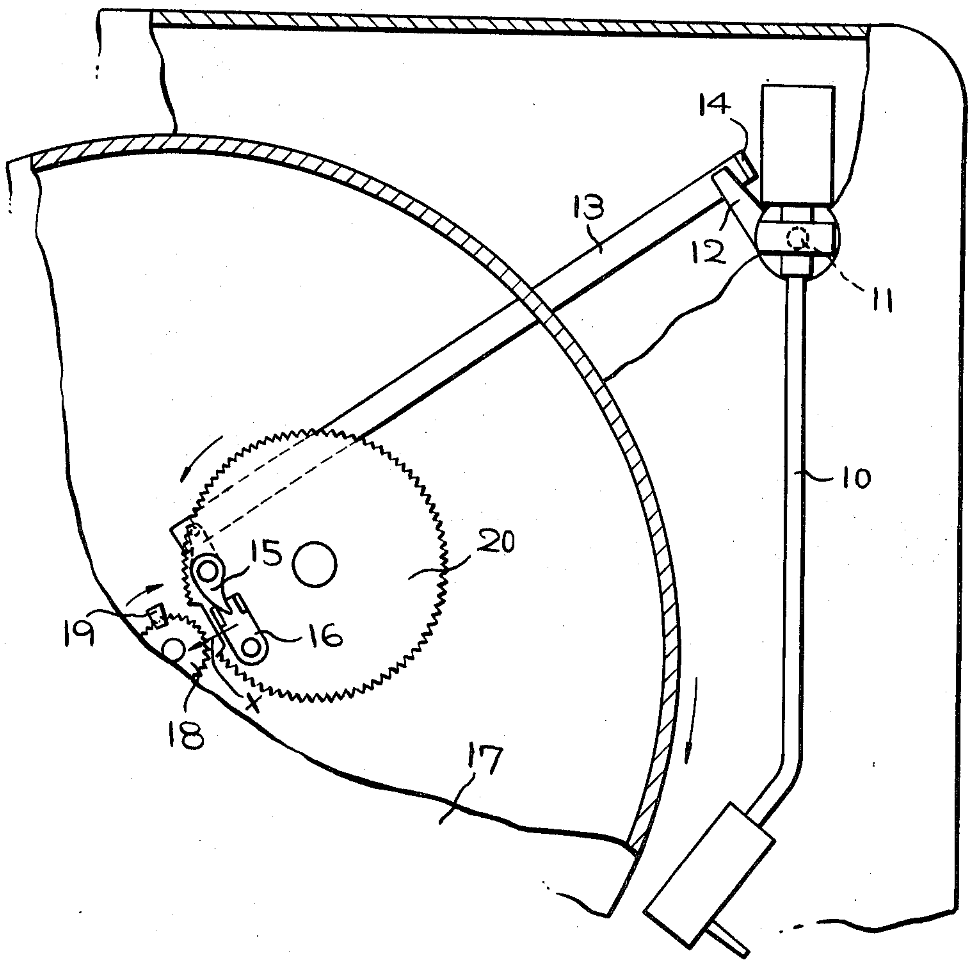
FIG. 1 is a plan view, with certain parts being cut out, of an automatic control device of the prior art for record players.
Figure 13:
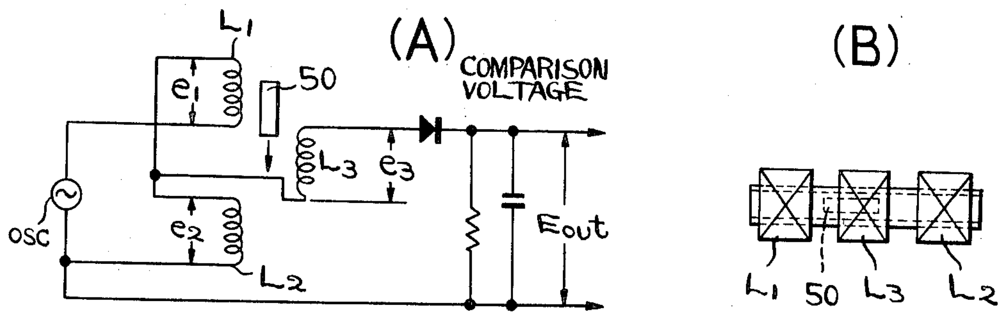
Figure 8:
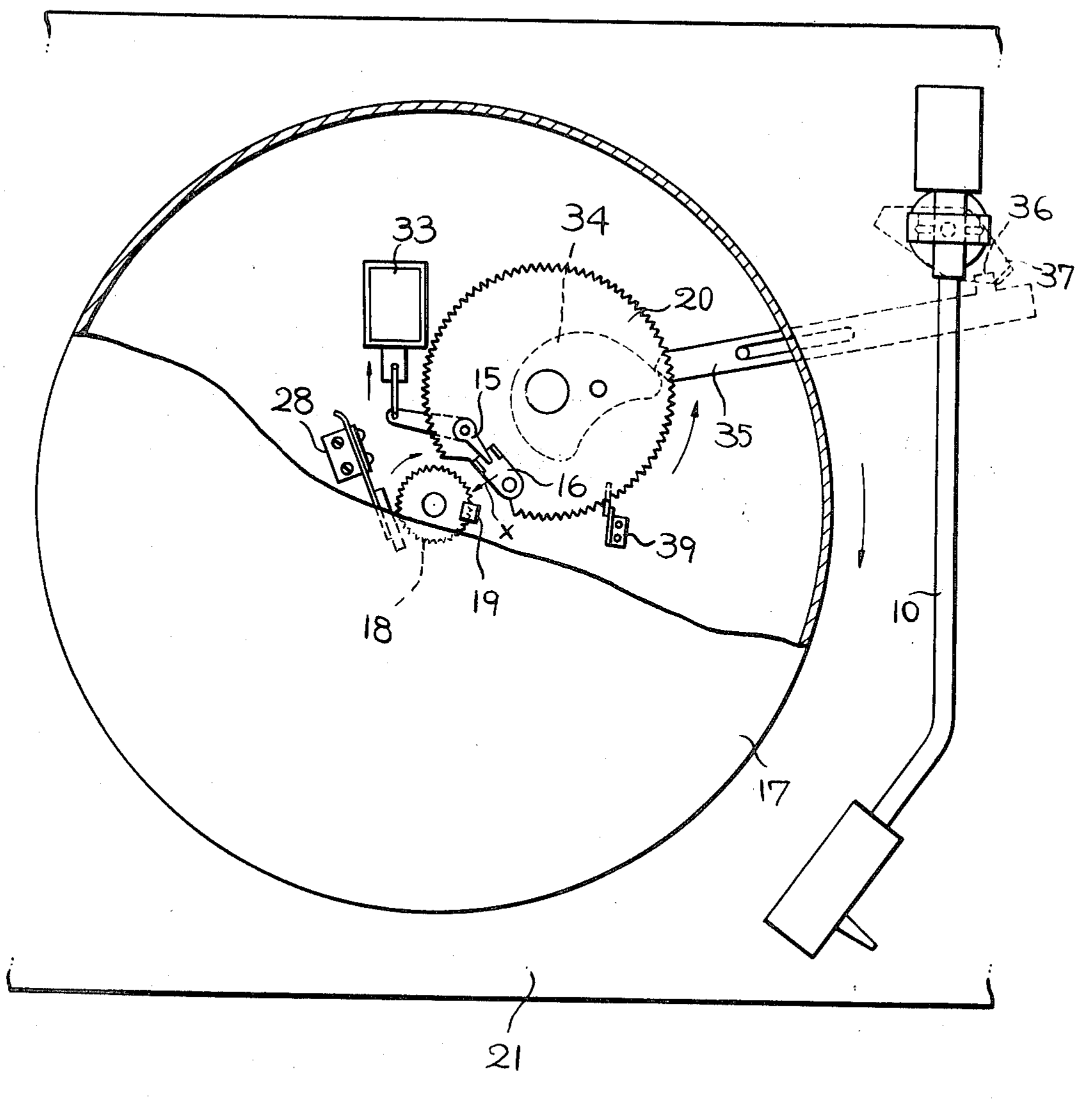
FIG. 8 is a plan view, with certain parts being cut out, one embodiment of pickup arm return means of the automatic control device according to this invention.
Figure 11:
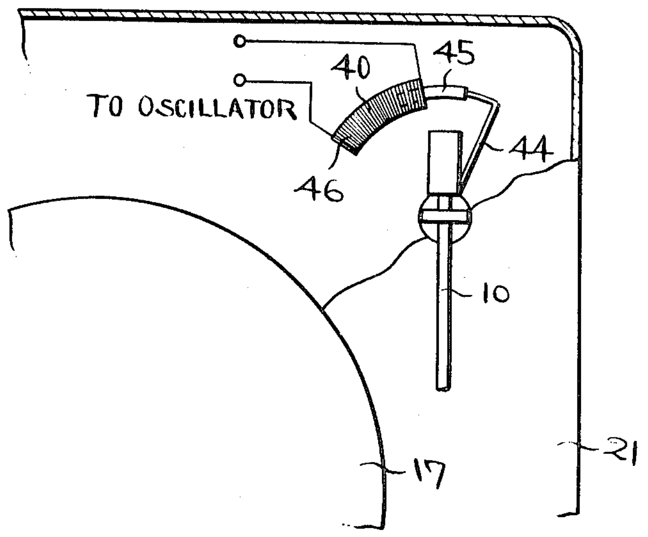
Figure 12:
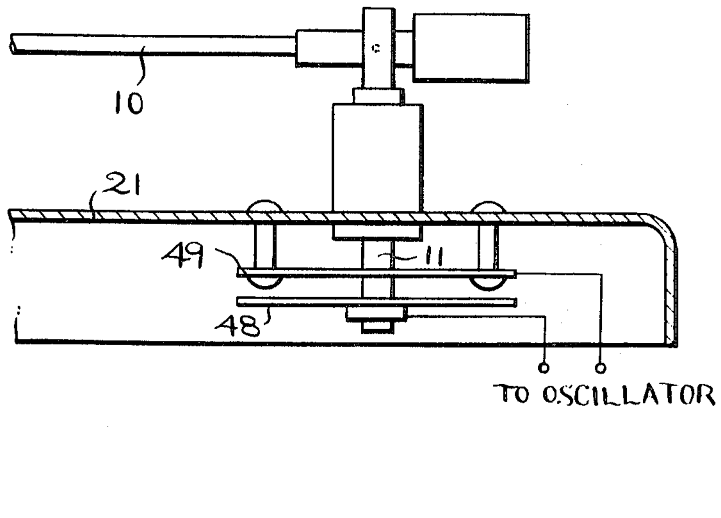

FIGS. 11 and 12 are a plan view and a side view respectively, with certain parts being cut out, of another embodiment of leadout groove position detecting means of the automatic control device according to this invention; and FIGS. 13A and 13B is a circuit diagram and a side view of a coil respectively of still another embodiment of leadout groove detecting means according to the device of this invention. In FIG. 1 is shown, a plan view, an automatic control device of the prior art for record players, with certain parts being cut out. As shown in FIG. 1, the prior art device includes a trip slide lever 13 connected through a lever 12 to a rotary shaft 11 for a pickup arm 10, said trip slide lever 13 being moved in sliding motion by said lever 12 while maintaining contact with a curved portion 14 as said pickup arm 10 is moved. When the pickup arm 10 is brought to a position in the leadout groove of the record, a trip 15 causes a trip 16 to move in pivotal motion in the direction of arrow X. This causes a pinion 19 of a turntable gear 18 rotating with a turntable 17 as a unit to come into contact with said trip 16, whereby a gear 20 is caused to rotate. This results in the gear 20 meshing with said turntable gear 18 which is also caused to rotate. As the gear 20 rotates, the pickup arm 10 is restored to its original position by known means. Since this prior art device is designed to mechanically detect the position of the leadout groove of a record, the pickup arm has to carry undue forces, with the result that the aforementioned disadvantage is inevitable.

The present invention obviates this disadvantage. The invention will be explained in detail with reference to FIGS. 2 to 13.

Figure 2:
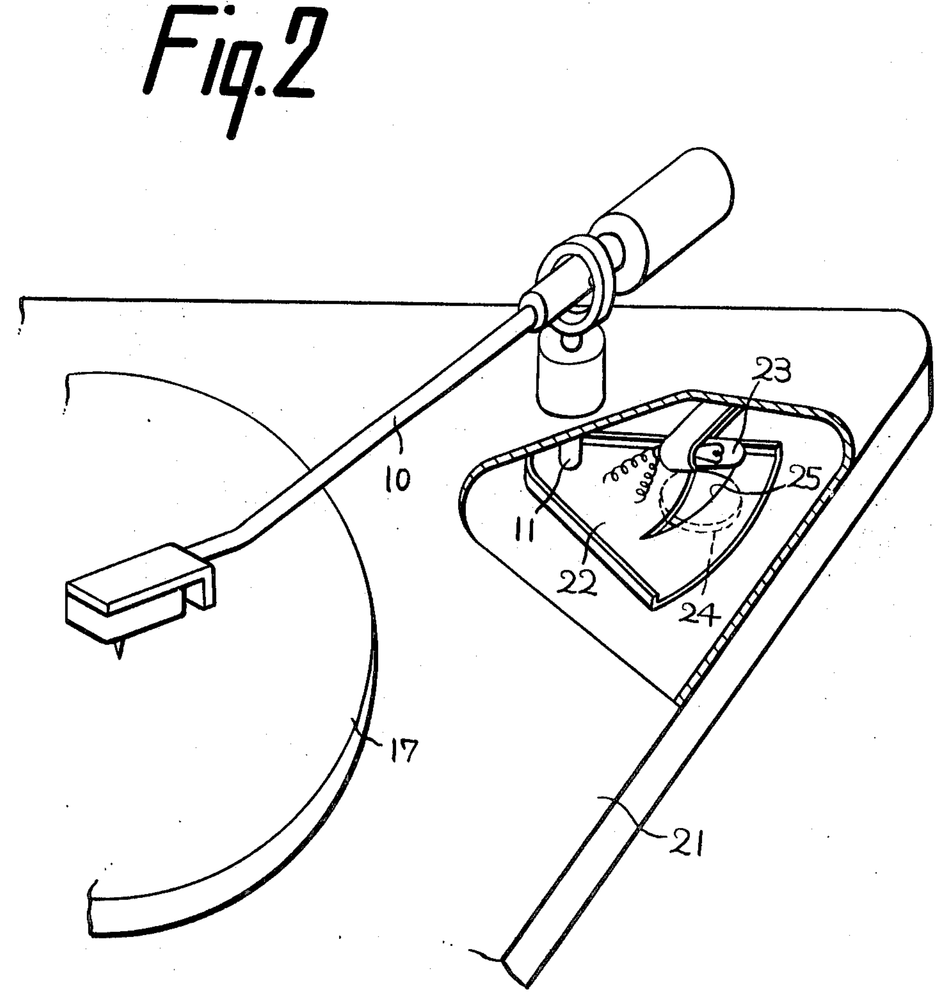
FIG. 2 is a perspective view, with certain parts being cut out, one embodiment of leadout groove detecting means of the automatic control device for record players according to this invention.
Figure 3:
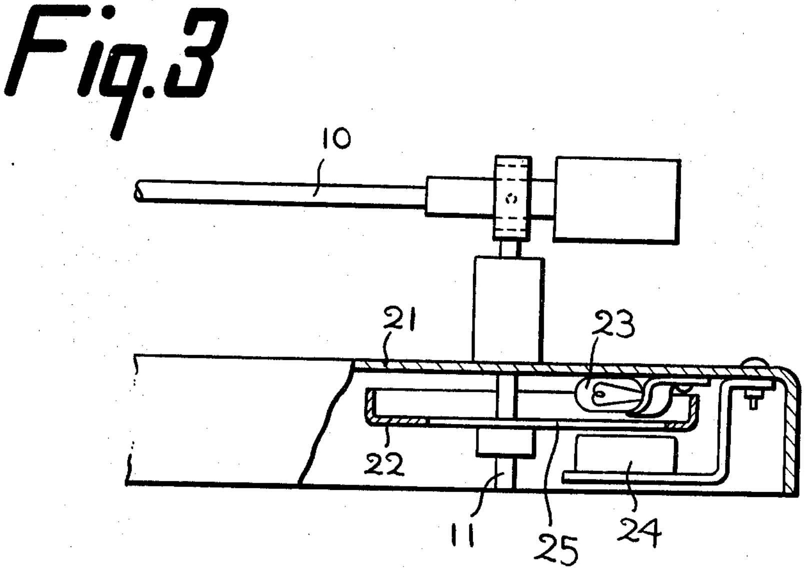
FIG. 3 is a side view, with certain parts being cut out, of the embodiment of the means illustrated in FIG. 2.
Figure 4:
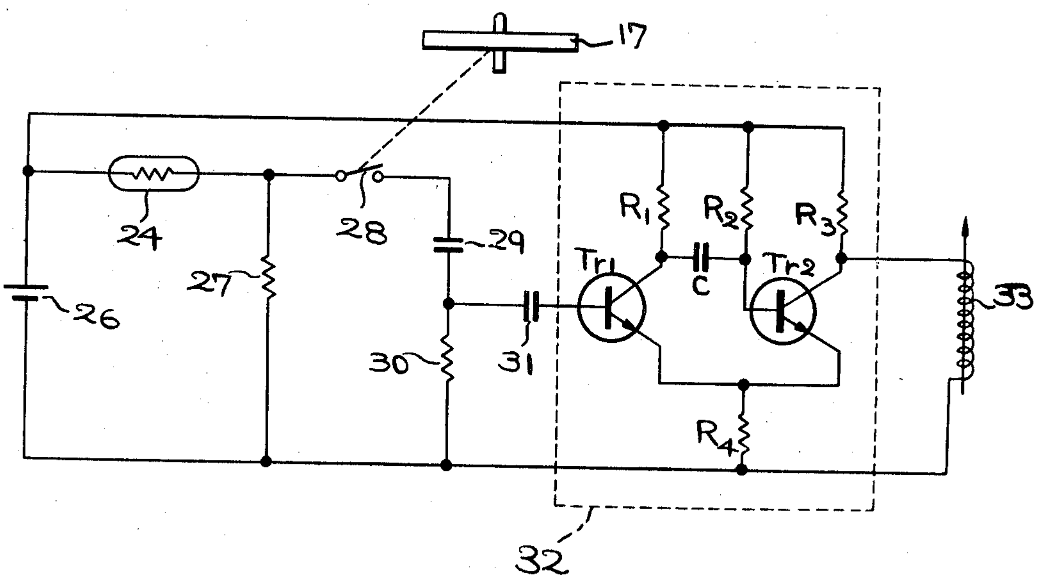
FIG. 4 is a circuit diagram of one embodiment of electric circuit of the automatic control device according to this invention.
Figure 5:
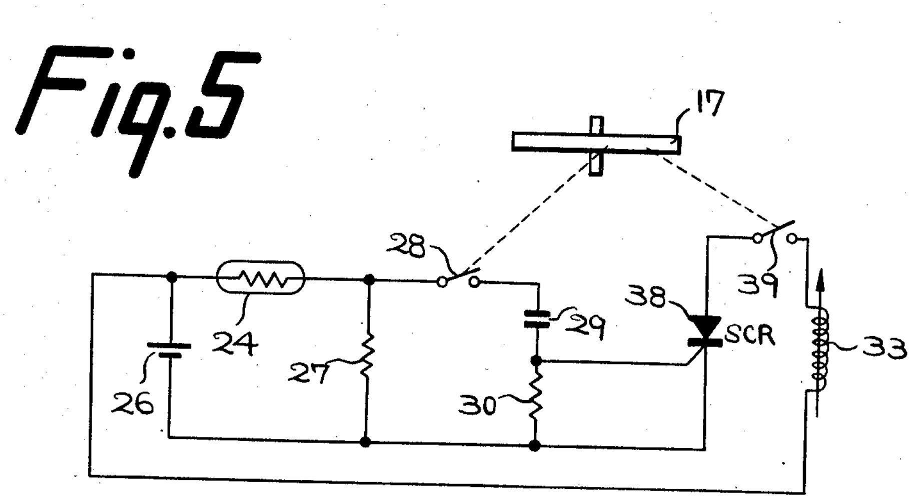
FIG. 5 is a circuit diagram of another embodiment of electric circuit of the automatic control device according to this invention.
Figure 6:
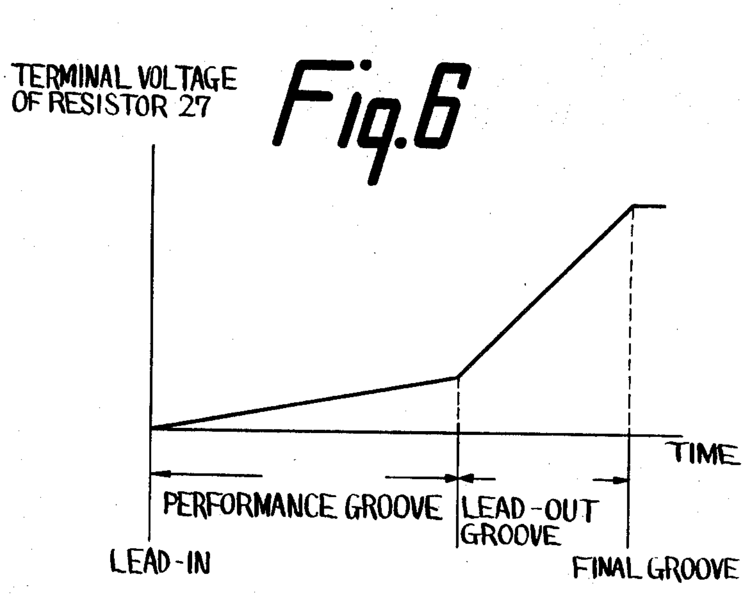
FIG. 6 is a diagrammatic representation of a change in voltage occurring in a specific resistor in the electric circuit shown in FIG. 4 or FIG. 5.
Figure 7:
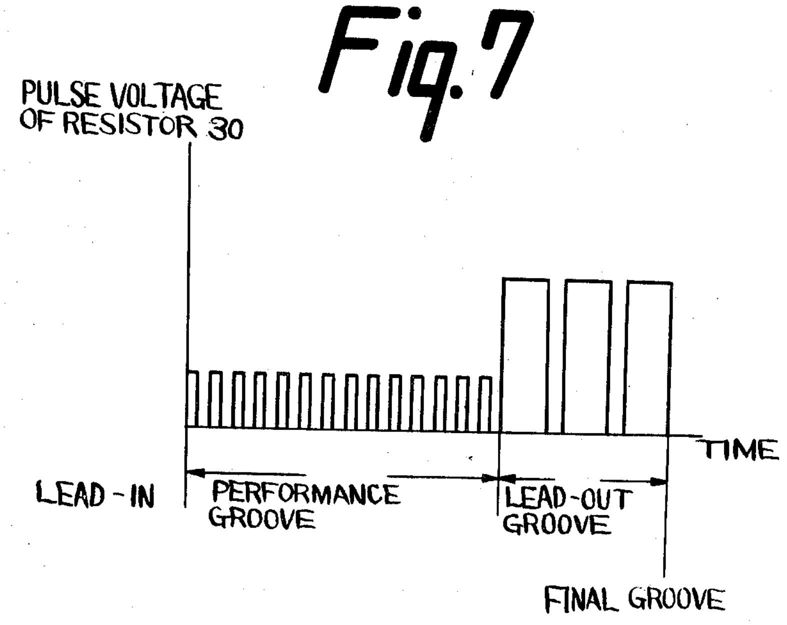
FIG. 7 is a view showing the pulse voltage produced by the change in voltage shown in FIG. 6.

FIGS. 2 and 3 are a perspective view and a side view respectively, with certain parts being cut out, of one embodiment of leadout groove detecting means of the automatic performance device for record players according to this invention 21 is a motor board; 22 is a light-intercepting plate secured to the lower end of a rotary shaft 11 of a pickup arm 10 for movement with said shaft; 23 is an electric bulb 24 is a photoelectric element as of cadmium sulfide (CdS) connected in the electric circuit shown in FIG. 4 or FIG. 5, said photoelectric element being mounted on the motor board 21 in such a manner that the element is disposed in face-to-face relation with the electric bulb 23 through the light-intercepting plate 22; and 25 is a window formed in the light-intercepting plate 22 in such a manner that the area of the opening of the window 25 increases with respect to the electric bulb 23 and photoelectric element 24 as the pickup arm 10 moves toward the center of the record. As the performance of the record progresses and the pickup arm 10 moves gradually toward the center of the record, the amount of light varies which is incident upon the photoelectric element 24 from the electric bulb 23 through the window 25 in the light-intercepting plate 22, causing a change in the value of an electric current flowing from power source 26 to a resistor 27 as shown in FIG. 4 or FIG. 5. Cadmium sulfide (CdS) is used as a photoelectric element 24 in this embodiment. As can be clearly seen from FIG. 2, intensity of light incident upon the cadmium sulfide (CdS) increases as the pickup arm 10 moves toward the center of the record. This causes a reduction in the resistance value of the cadmium sulfide (CdS) and a concomitant rise in the value of current flowing to the resistor 27, with the result that the voltage on opposite ends of the resistor 27 shows a change as shown in FIG. 6 in response to the movement of the pickup arm 10. A switch 28 shown in FIG. 4 and FIG. 5 has a contact which is attracted by a magnet mounted on the turntable 17 so that the contact is closed for a short while for each revolution of the turntable and then opened again. On the other hand, a capacitor 29 is charged such that the voltage of the resistor 27 always follows suit, so that while the pickup arm 10 is moving a charge current flows each time the contact 28 is actuated. Thus, a pulse voltage is produced in a resistor 30 which is proportional, as shown in FIG. 7, to said charge current (said pulse voltage represents a difference between the voltage produced in the resistor 27 and the charge voltage of the capacitor 29). As shown in FIG. 6 and FIG. 7, the pickup arm 10 has a small feed pitch in the performance groove of the record, and consequently there is little variation in voltage at opposite ends of the resistor 30. Since, however, the feed pitch of the pickup arm 10 increases as it enters the leadout groove, the voltage at opposite ends of the resistor 27 rises rapidly. With this rise in voltage, the charge current of capacitor 29 increases in value and a high-pulse voltage is produced at opposite ends of the resistor 30. In the circuit shown in FIG. 4, this pulse voltage is introduced into the pulse input terminal of a known monostable multivibrator 32 through a capacitor 31. Said multivibrator 32 has a circuit constant such that it does not actuate a plunger-type solenoid 33 when the pickup arm 10 is positioned in the performance groove but that it actuates said plunger 33 when the pickup arm 10 is in the leadout groove. The mechanical action of said plunger 33 moves the trip 16 of the automatic control device shown in FIG. 8, for example, in the direction of arrow X. This strip 16 engages the projection 19′ formed on the pinion 18 which is formed integrally with the center shaft of the turntable, whereby the pinion 18 is brought into meshing engagement with the gear 20 and causes the latter to rotate. Rotation of the gear 20 causes a sliding lever 35 engaging a deformed cam 34 to move in sliding motion. As the sliding lever 35 moves, a projection 36 formed on the lever 35 causes a lever 37 formed integrally with the shaft of pickup arm 10 to rotate, whereby the pickup arm 10 is restored to its rest position. A series of performances are thus finished. Instead of being connected to the plunger-type solenoid 33, the multivibrator 32 may alternatively be connected to an electric motor or the like which can convert an electrical energy into a mechanical one.

FIG. 5 shows an embodiment of circuit in which a known silicon-controlled rectifier 38 is used in place of the monostable multivibrator. The silicon-controlled rectifier 38 has a circuit constant such that it is fired by the pulse voltage which is produced, as shown in FIG. 7, when the pickup arm is in the leadout groove, but is is not fired by the pulse voltage produced when performance is in progress. The silicon-controlled rectifier may be connected in series with the plunger-type solenoid 33 which, as described previously, moves the trip 16 of automatic control device shown in FIG. 8 in the direction of arrow X. Engagement of the trip 16 with the projection 19 formed in the pinion 18 brings the pinion 18 into meshing engagement with the gear 20 which is caused to rotate by the pinion 18. The mechanism of gear motion is such that a switch 39 is opened so as to render the silicon-controlled rectifier inoperative. Thus, a series of performances are finished.

Instead of being connected to the plunger-type solenoid, the silicon-controlled rectifier may alternatively be connected to an electric motor, a servomotor, bimetal device or the like which can convert an electrical energy into a mechanical one.

Figure 9:
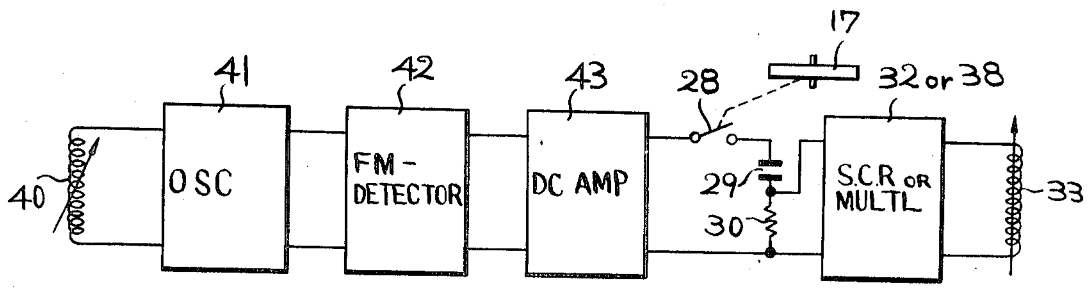
FIGS. 9 and 10 are block diagrams of embodiments of electric circuit of the control device according to this invention.
Figure 10:
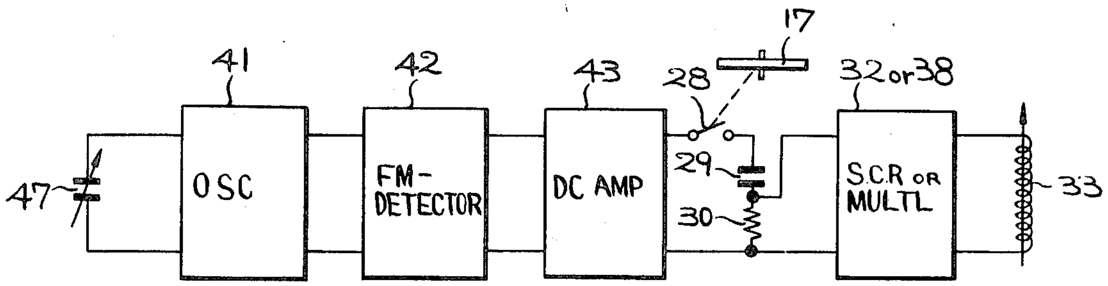

FIG. 9 shows a block diagram of an embodiment of circuit in which a variable coil 40 coupled to the pickup arm is used in the leadout groove detecting means. When the pickup arm 10 moves into the leadout groove of a record, there suddenly occurs a change in the inductance of the variable coil 40, causing a sudden change in the frequency of an oscillator circuit. This sudden increase or decrease in the frequency of oscillator circuit is detected and passed on, through an FM detector A2 and DC amplifier 43, to the pulse-detection circuit comprising, as described above, the switch 28, capacitor 29 and resistor 30, thence through the multivibrator 32 or silicon-controlled rectifier 38 to the plunger-type solenoid 33 which acts as a source of drive for the automatic control device. FIG. 11 shows a plan view of the embodiment in which the variable coil 40 is used. A dust core 45 mounted on a lever 44 secured to the rotary shaft of the pickup arm 10 is gradually moved in and out of a coil 46 secured to the motor board 21 as the pickup arm 10 moves. When the pickup arm 10 is positioned in the leadout groove, the rate at which the dust core 45 is moved in and out of the coil 46 suddenly increases, thereby causing a sudden change in the oscillator frequency. FIG. 10 shows a block diagram of an embodiment of circuit in which a variable capacitor 47 is used in place of the variable coil 40. In FIG. 12 which shows a side view of the embodiment using the variable capacitor 47, a movable pole plate 48 secured to the rotary shaft of the pickup arm 10 is disposed in face-to-face relation with a fixed pole plate 49 secured to the motor board 21. The pole plates are designed such that the area of the plates facing each other varies with the movement of the pickup arm 10 with an attendant change in electrostatic capacity. The electric circuit connected to the variable capacitor 47 is similar to the circuit described with reference to the embodiment shown previously, so that description of its operation is omitted.

FIGS. 13A and 13B show still another embodiment of leadout groove detecting means. Electric currents flowing to a coil $L_1$ and a coil $L_2$ are reversed in phase. When a dust core 50 coupled to the pickup arm 10 is in the center of a coil $L_3$, and output voltage E out is zero, but as the dust core 50 moves toward the coil $L_1$ or coil $L_2$, an output voltage of positive or negative polarity is produced. The polarity of this voltage is detected and the voltage is introduced into the electric circuit described previously, so that the electrical energy can be converted into a mechanical force for actuating the mechanism of the automatic control device.

What I claim is:

1. An automatic control device for record players comprising voltage-generating means connected to a pickup arm for generating a rising voltage in amplitude in response to movement of said pickup arm, circuit means including a series combination of a capacitor and a resistor, normally open switch means, means momentarily closing said normally open switch means at a predetermined point in every revolution of a turntable, means for applying said rising voltage across said series combination of a capacitor and a resistor through said switch means to produce a pulse signal across said resistor by current flowing through said series combination of a capacitor and a resistor, said pulse signal being proportional amplitude to a variation of the rate of movement of said pickup arm, and restoring means for restoring said pickup arm to its original position in response to said pulse signal when the amplitude of said pulse signal exceeds a predetermined level.

2. The automatic control device as claimed in claim 1, which said switch means comprises a magnet mounted on the turntable and a fixed normally opened switch, the movable contact of which is attracted by said magnet when said magnet comes near said switch so that said switch is closed.

3. The automatic control device as claimed in claim 1, which said restoring means comprises a plunger-type solenoid operable in response to the pulse signal, a gear brought into meshing engagement with a turntable gear for rotation as said plunger is actuated, and a lever member for moving the pickup arm to return to its original position as said gear is rotated.

4. The automatic control device as claimed in claim 1, in which said voltage-generating means comprises a light-intercepting plate formed with a window and secured to a rotary shaft of the pickup arm for movement as said rotary shaft rotates, said window being formed such that the area of the opening of the window increases as the pickup arm moves toward the center of the turntable, a light source disposed in face-to-face relation with said window of said light-intercepting plate, and a photoelectric element disposed in face-to-face relation with said light source through said light-intercepting plate and having a resistance which shows a change in value corresponding to change in the amount of light incident thereupon through said window in the light-intercepting plate.

5. The automatic control device as claimed in claim 1, in which said restoring means comprises multivibrator means responsive to said pulse signal for producing an output signal only when the amplitude of said pulse signal exceeds a predetermined level, a plunger-type solenoid operable in response to said output signal, a gear brought into meshing engagement with a turntable gear for rotation as said plunger is actuated, and a lever member for moving the pickup arm to return to its original position as said gear is rotated.

6. The automatic control device as claimed in claim 1, in which said restoring means comprises a silicon-controlled rectifier responsive to said pulse signal and adapted to be fired only when the amplitude of said pulse signal exceeds a predetermined level, a plunger-type solenoid connected in series with said silicon-controlled rectifier through a power source and adapted to be actuated when said silicon-controlled rectifier is fired, a gear brought into meshing engagement with a turntable gear for rotation as said plunger is actuated, and a lever member for moving the pickup arm to return to its original position as said gear is rotated.

7. The automatic control device as claimed in claim 6, in which said restoring means further comprises a normally closed switch electrically connected between said silicon controlled rectifier and said plunger-type solenoid, and means for opening said normally closed switch for every revolution of the turntable following the elapse of a certain predetermined time interval after said silicon-controlled rectifier is fired.